(12) United States Patent
Angel et al.

(10) Patent No.: US 9,215,209 B2
(45) Date of Patent: Dec. 15, 2015

(54) SOURCE REQUEST MONITORING

(71) Applicant: U.S. Bancorp, National Association, Minneapolis, MN (US)

(72) Inventors: Mark Angel, Minneapolis, MN (US);
Bradley Butts, Minneapolis, MN (US);
Tim Held, Minneapolis, MN (US);
David Kuhn, Minneapolis, MN (US);
William Alexander Sheridan, Minneapolis, MN (US)

(73) Assignee: U.S. Bancorp, National Association, Minneapolis, MN (US)

( * ) Notice: Subject to any disclaimer, the term of this patent is extended or adjusted under 35 U.S.C. 154(b) by 85 days.

(21) Appl. No.: 14/075,508

(22) Filed: Nov. 8, 2013

(65) Prior Publication Data
US 2015/0135253 A1    May 14, 2015

(51) Int. Cl.
*H04L 29/00* (2006.01)
*H04L 29/06* (2006.01)
*G06F 21/62* (2013.01)
*G06F 21/55* (2013.01)

(52) U.S. Cl.
CPC ............ *H04L 63/0227* (2013.01); *G06F 21/62* (2013.01); *H04L 63/0236* (2013.01); *H04L 63/0254* (2013.01); *H04L 63/10* (2013.01); *H04L 63/101* (2013.01); *H04L 63/14* (2013.01); *H04L 63/1408* (2013.01); *H04L 63/1425* (2013.01); *G06F 21/552* (2013.01); *H04L 63/105* (2013.01); *H04L 63/30* (2013.01)

(58) Field of Classification Search
CPC ......... H04L 63/02; H04L 63/10; H04L 63/14; H04L 63/03
USPC ................... 726/1–14, 21–30; 713/153–154, 713/187–188
See application file for complete search history.

(56) References Cited

U.S. PATENT DOCUMENTS 7,849,502 B1 * 12/2010 Bloch et al. ..................... 726/11
(Continued)

OTHER PUBLICATIONS

Dietrich, Christian J., and Christian Rossow. "Empirical research of IP blacklists." ISSE 2008 Securing Electronic Business Processes. Vieweg+ Teubner, 2009. 163-171.*
(Continued)

*Primary Examiner* — Madhuri Herzog
(74) *Attorney, Agent, or Firm* — Foley & Lardner LLP (57) ABSTRACT

A method includes establishing an IP address whitelist including an acceptable IP address, establishing a resource whitelist including an acceptable resource request, establishing a resource blacklist including an indicator of a malicious resource request, and analyzing a resource request. Analyzing the resource request includes determining if a requestor IP address of the resource request is in the IP address whitelist, determining if the requested resource is in the resource whitelist, and determining if the requested resource is in the resource blacklist. A whitelist violation review is initiated, responsive to determining the requestor IP address is not in the IP address whitelist and the requested resource is not in the resource whitelist. A blacklist violation review is initiated, responsive to determining the requested resource is in the resource blacklist and the requestor IP address is not in the IP address whitelist and the requested resource is not in the resource whitelist.

19 Claims, 7 Drawing Sheets

(56) References Cited

U.S. PATENT DOCUMENTS

| | | |
|---|---|---|
| 8,321,936 B1 | 11/2012 | Green et al. |
| 2004/0007381 A1 | 1/2004 | Vokey |
| 2009/0328187 A1 | 12/2009 | Meisel |
| 2012/0084423 A1* | 4/2012 | McGleenon ............... 709/223 |
| 2012/0191693 A1* | 7/2012 | Alexander ............... 707/709 |
| 2012/0278886 A1 | 11/2012 | Luna |

OTHER PUBLICATIONS

Cook, Duncan, et al. "Catching spam before it arrives: domain specific dynamic blacklists." Proceedings of the 2006 Australasian workshops on Grid computing and e-research-vol. 54. Australian Computer Society, Inc., 2006.*

* cited by examiner

SOURCE REQUEST MONITORING

BACKGROUND

The following description is provided to assist the understanding of the reader. None of the information provided or references cited is admitted to be prior art.

Malicious software can be programmed by attackers to disrupt normal computer operations, gather sensitive information, and gain access to private computer systems. Attackers often use such malicious software to manipulate Hypertext Transfer Protocol (HTTP) requests in order to attack a server that is running a network-based application. For example, an attacker may attempt to exploit certain unsafe HTTP methods, or the attacker may format the parameters of a request in an effort to force the server to respond in a manner desired by the attacker. An attacker may also utilize HTTP requests for reconnaissance to gain knowledge of a server or a web application's structure and configuration. Traditionally, operators of servers implement a firewall or other malware security tools to protect their servers.

SUMMARY

An illustrative method is provided. The method includes establishing an IP address whitelist comprising an acceptable IP address, establishing a resource whitelist comprising an acceptable resource request, establishing a resource blacklist comprising an indicator of a malicious resource request, and analyzing a resource request. Analyzing the resource request includes determining if a requestor IP address of the resource request is in the IP address whitelist, determining if the requested resource is in the resource whitelist, and determining if the requested resource is in the resource blacklist. The method further includes initiating a whitelist violation review, responsive to determining that the requestor IP address is not in the IP address whitelist and the requested resource is not in the resource whitelist. The method further includes initiating a blacklist violation review, responsive to determining that the requested resource is in the resource blacklist and the requestor IP address is not in the IP address whitelist and the requested resource is not in the resource whitelist.

An illustrative system is also provided. The system includes a computing device configured to establish an IP address whitelist comprising acceptable IP addresses, establish a resource whitelist comprising acceptable resource requests, establish a resource blacklist comprising indicators of malicious resource requests, and analyze a resource request. To analyze the resource request, the computing device is configured to determine if a requestor IP address of the resource request is in the IP address whitelist, determine if the requested resource is in the resource whitelist, and determine if the requested resource is in the resource blacklist. The computing device is further configured to initiate a whitelist violation review, responsive to determining that the requestor IP address is not in the IP address whitelist and the requested resource is not in the resource whitelist. The computing device is further configured to initiate a blacklist violation review, responsive to determining that the requested resource is in the resource blacklist and the requestor IP address is not in the IP address whitelist and the requested resource is not in the resource whitelist.

An illustrative non-transitory computer-readable medium is also provided. The non-transitory computer-readable instructions stored thereon. The instructions include instructions to establish an IP address whitelist comprising acceptable IP addresses, instructions to establish a resource whitelist comprising acceptable resource requests, instructions to establish a resource blacklist comprising indicators of malicious resource requests, and instructions to analyze a resource request. The instructions to analyze the resource request include instructions to determine if a requestor IP address of the resource request is in the IP address whitelist, instructions to determine if the requested resource is in the resource whitelist, and instructions to determine if the requested resource is in the resource blacklist. The instructions further include instructions to initiate a whitelist violation review, responsive to determining that the requestor IP address is not in the IP address whitelist and the requested resource is not in the resource whitelist. The instructions further include instructions to initiate a blacklist violation review, responsive to determining that the requested resource is in the resource blacklist and the requestor IP address is not in the IP address whitelist and the requested resource is not in the resource whitelist.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope; the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Described herein are a method, system, and computer-readable medium for monitoring Hypertext Transfer Protocol (HTTP) resource requests sent to server (or servers). In general, the server(s) can host an application or set of applications that utilize the HTTP protocol to facilitate communications with a client and to facilitate operation of an application. Typically, the applications are accessible remotely via the internet or an internal network connection (e.g., an intranet). For example, a customer of a financial institution can use a browser to connect to a web application hosted by a server of the financial institution. The application may be related to account services, and the customer can browse his or her account details, and perform other actions provided by the web application. Throughout the interaction, the customer's browser and the web application communicate using the HTTP protocol, including the client's browser transmitting various HTTP resource request messages to the server in order to obtain resources of the web application. For example, such an HTTP request may be used by the browser to obtain an image "logo.jpg" or a script file "script.js" or an application web page "login.html", etc. In general, such an HTTP request includes components as defined by the HTTP protocol, for example, a general-header, a request-header, an entity-header, a message-body, etc., can all be included in the request. These components also include fields that specify various items related to the request, such as a Request-URI that identifies the resource being requested. A field may also be included that identifies a source/client IP address. Alternatively, IP address information for a source/client may be obtained from a packet that is used to transmit the HTTP request.

In an illustrative embodiment, a resource request and the IP address corresponding to the resource request are compared to a whitelist of valid resource requests and a whitelist of valid IP addresses. The resource request is further compared to a blacklist of known malicious resource requests. Based on the comparisons, it is determined if a resource request violation has occurred, which prompts further analysis. A correlation with malicious activity related to a resource request is sought by cross-referencing activity in other systems and cross-referencing appropriate industry analysis and threat intelligence. Based on this analysis, the whitelists (e.g., known valid resource requests/valid IP addresses) and blacklist (e.g., known malicious resource requests) are established and further maintained. Also based on the analysis, alerts can be generated to notify system operators of indicators corresponding to the presence of malware on customer computers, the reconnaissance work of hackers, the attempted exploits of an application, and/or active attacks on a server (or other infrastructure devices). The analysis may be further used for detection and mitigation of cyber-attacks, predicting additional indicators of malware, predicting large scale infrastructure attacks, and/or predicting fraud.

Figure 1:
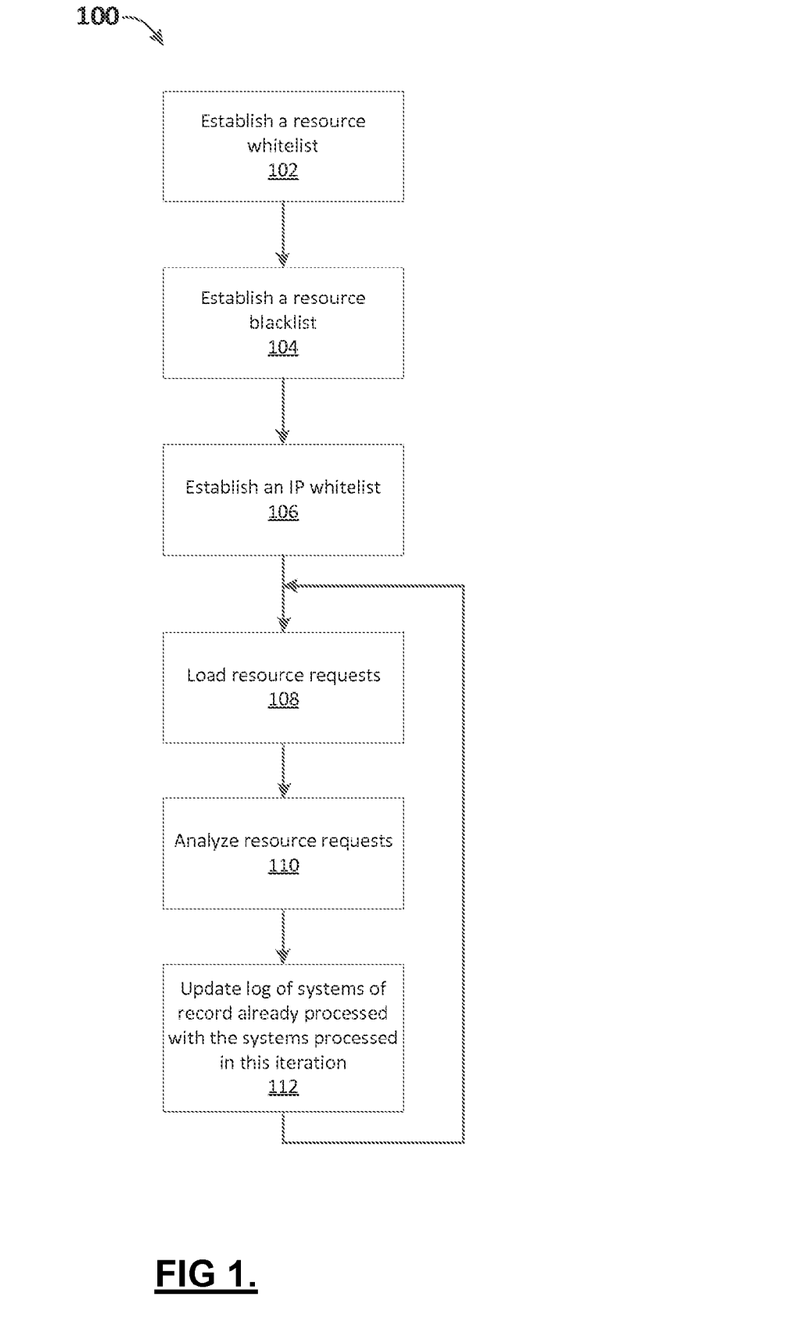
FIG. 1 is a flow diagram illustrating operations of a main process for monitoring resource requests in accordance with an illustrative embodiment.

FIG. 1 is a flow diagram illustrating operations of a main process 100 for monitoring HTTP resource requests in accordance with an illustrative embodiment. In alternative embodiments, fewer, additional, and/or different operations may be performed. The operations described with reference to FIG. 1 can be performed by a financial institution such as a bank, credit union, etc., or any entity that offers internet (or intranet) accessible applications that are hosted on a server. In an illustrative embodiment, the operations of FIG. 1 are performed by a system of the financial institution (e.g., an application server). Alternatively, one or more of the operations can be performed manually by employees of the financial institution. The operations of process 100 can be performed synchronously or asynchronously, and multiple processes 100 can be instantiated concurrently across multiple systems. In such an embodiment, multiple systems can access shared data (e.g., shared whitelists and/or blacklists, etc.).

In an operation 102 a resource whitelist is established. The resource whitelist includes acceptable or valid resources that can be requested by a client. The whitelist may be stored according to any format and can particularly specify types of resources that are acceptable to be requested. For example, an image resource type of "image.png" may be allowed by the whitelist. The whitelist can also generically specify resources. For example, the whitelist may allow for resources to be identified using wildcards, such as "image*.png", where * corresponds to any characters to be matched. Thus, as long as the request is for a file that has a name matching the "image*.png" pattern (e.g., "image5.png"), then the request for that resource would match the whitelist entry and would be deemed an acceptable request. As another example, the whitelist may allow for resources to be identified using regular expressions. For example, an entry may be formatted as "image\.(png|jpg)" in order to match a resource request for "image.png" or "image.jpg", etc. Other wildcard and regular expression formats may also be used. In an illustrative embodiment, the whitelist specifically or generically defines the URI path of an acceptable resource. Using the whitelist, application related URI's can be mapped, with all possible acceptable resources added as entries on the resource whitelist. In this manner, any requests not found on the resource whitelist may be deemed to be for a "non-existent" or not-allowed resource. Requests for resources not on the resource whitelist can then be analyzed in further detail to determine if they are related to malicious activity. It should be understood, that the scope of the present disclosure is not limited to a certain whitelist format. In an illustrative embodiment, the whitelist is structured as an XML document of acceptable resources. In another illustrative embodiment, the whitelist is structured as a text file including a list of URI entries corresponding to acceptable resources. In another illustrative embodiment, the whitelist is based on entries stored in a database that correspond to acceptable resources. The resource whitelist can also be established using default entries based on appropriate industry analysis and threat intelligence. The whitelist can also include entries based on a particular institution's experience and intelligence, and can be tailored to a particular application provided by the institution.

In an operation 104, resource blacklist is established. The resource blacklist can be similarly structured as the resource whitelist (e.g., a text file, an XML file, stored in a database, etc.); however, the resource blacklist corresponds to indicators of maliciousness. The indicators of maliciousness can be pre-defined (e.g., based on industry analysis or based on an institution's knowledge). For example, it may be known that a certain file, "error.js", corresponds to a resource commonly associated with a malware application, and thus an entry for "error.js" can be included in the resource blacklist. The resource blacklist may allow resources to be generically identified (e.g., using wildcards or regular expression matching, etc.). For example, the resource blacklist may contain an entry that includes a wildcard, such as "error.*", where * corresponds to any characters to be matched. Thus, as long as the request is for a file that has a name matching the "error.*" pattern (e.g., "error.js"), then the request for that resource would match the resource blacklist entry. Additionally, entries may be formatted to support regular expression matching. For example, an entry may be formatted as "fakefile\.(js|php|aspx)" in order to match resource requests for "fakefile.js", "fakefile.php", or "fakefile.aspx", etc. The scope of the present disclosure is not limited to certain wildcard or regular expression format, and additional matching formats may be used. The resource blacklist may also include entries corresponding to non-existent resources. For example, a particular piece of malware may be known to request a resource of "app.config" whether or not "app.config" is an actual resource of an application. By leveraging this knowledge, an application running on a server may be configured to function without using an "app.config" file, and an entry corresponding to "app.config" can be added to the resource blacklist. Thus, if it is detected that a resource request is received for "app.config", the existence of maliciousness may be determined. Additionally, the resource blacklist may be small or have no entries at the inception of process 100, however, the resource blacklist will generally grow over time as process 100 monitors additional resource requests and additional items are added to the blacklist.

In an operation 106, an IP whitelist is established. The IP whitelist is generally a list of trusted IP addresses to be used in monitoring process 100. In an illustrative embodiment, the IP whitelist includes entries that correspond to trusted partners. In another illustrative embodiment, the IP whitelist includes entries that correspond to trusted internal and/or external testers, users, or devices. The IP whitelist can be similarly structured as the resource whitelist and blacklist (e.g., a text file, an XML file, stored in a database, etc.). The IP whitelist may also allow for IP addresses to be generically identified (e.g., using wildcards or regular expression matching, etc.). For example, the IP whitelist may include an entry that includes a wildcard, such as "127.0.5.*", which can be used to match various IP addresses of a local intranet, such as "127.0.5.100", "127.0.5.101", and "127.0.5.102", etc. As another example, the IP whitelist may include a regular expression entry formatted as "151\0.207\0.247\0.13[0-2]", which can be used to match a range of IP address, such as "151.207.247.130", "151.207.247.131", and "151.207.247.132". Other wildcard and regular expression formats may also be utilized. In addition to IPv4 formatted addresses, the IP whitelist may also support IPv6 formatted addresses, and the scope of the present disclosure is not limited to a certain IP address format. Using the IP whitelist, a requestor IP address corresponding to an incoming resource request can be checked against the entries of the IP whitelist. If the requestor IP address is found in the IP whitelist, then it can be determined with a greater confidence that the resource request is valid. In an illustrative embodiment, process 100 can terminate the current processing cycle of a resource request if the resource request is received from a requestor IP that is deemed to be trusted through a comparison with the IP whitelist. If the requestor IP address is not found in the IP whitelist, then further analysis of the resource request can be initiated as described further herein.

It should be understood that any of the whitelists and blacklists discussed herein can be newly created by process 100. However, in an alternative embodiment, the whitelists and/or blacklists can be initially populated or be pre-populated based on prior cycles of process 100. A whitelist or blacklist can also be imported to a system implementing process 100, or they can be supplied from a third party provider. For example, a security organization may maintain an industry blacklist, which may be imported for use with process 100. In an alternative embodiment, multiple versions of whitelists and blacklists can be maintained to correspond to different configurations of process 100. Also, although referred to separately as a "whitelist" or "blacklist", each whitelist or blacklist can also be maintained as a single list, file, or database including both whitelist and blacklist components.

In an operation 108, resource requests are loaded for analysis. A resource request can be loaded dynamically in real time as the request is received at a server, or a resource request may be stored (or cached) and analyzed at a predetermined time. In an illustrative embodiment, multiple resource requests are stored, and process 100 analyzes the resource requests from the batch of stored requests. Resource requests corresponding to multiple servers or applications can also be compiled and then loaded and analyzed. In an illustrative embodiment, the resource requests are loaded according to a system-by-system basis, where the requests corresponding to first system or application are loaded and analyzed, and then the requests corresponding to a second system or application are loaded and analyzed. The resource request loading process of operation 108 is more fully described below with reference to sub-process 200, as depicted in FIG. 2.

Figure 3:
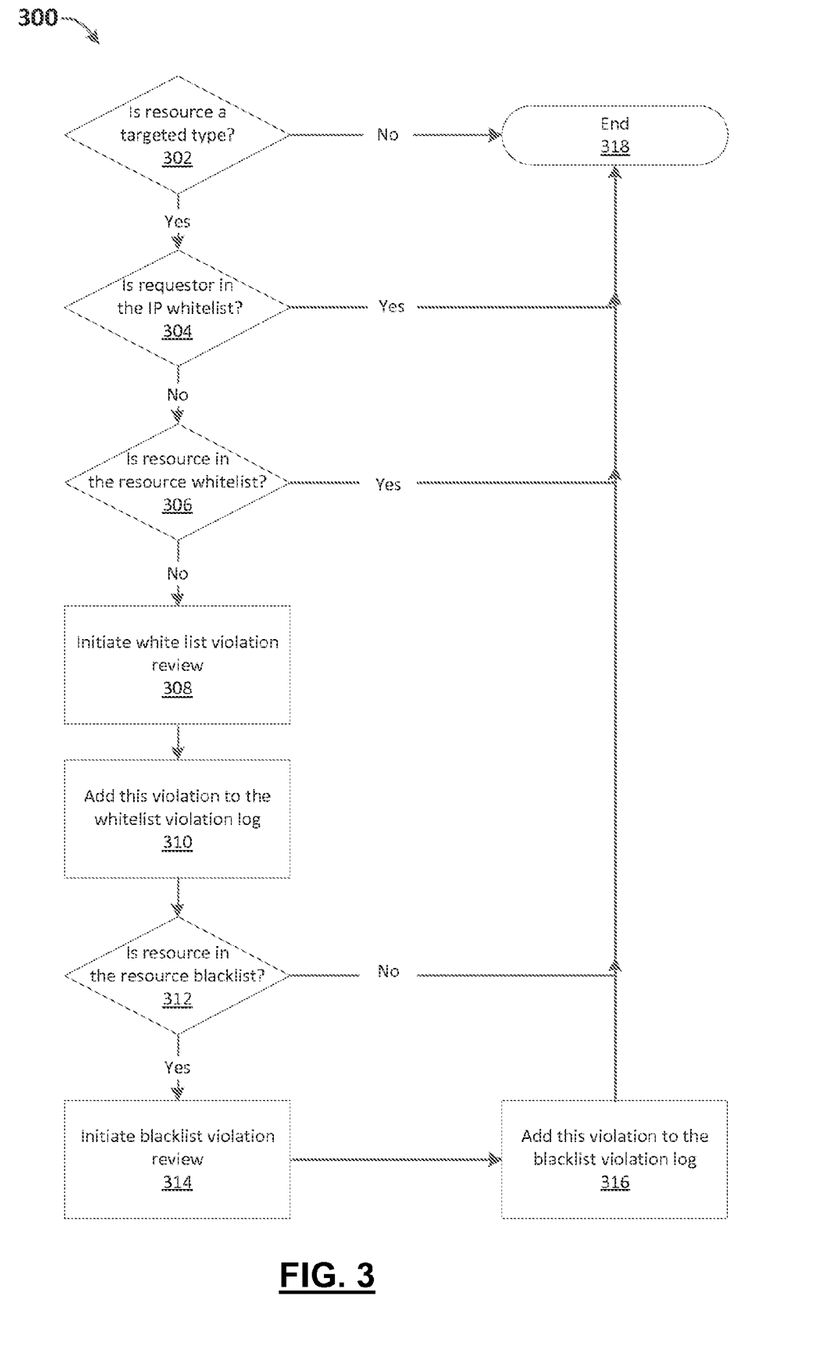
FIG. 3 is a flow diagram illustrating operations of a sub-process for analyzing a resource request in accordance with an exemplary embodiment.

In an operation 110, one or more loaded resource requests are analyzed. The URI component of a resource request is compared to the resource whitelist and the resource blacklist, and the IP address corresponding to the request is compared to the IP whitelist. Based on these comparisons, further actions are taken or not taken. The resource request analysis process of operation 110 is more fully described below with reference to sub-process 300, as depicted in FIG. 3. A log (e.g., a text file, an XML document, a database, etc.) of the systems or applications whose resource requests have been analyzed is maintained to keep a history of the requests that were analyzed. In an operation 112, a system or application whose resource requests have been analyzed by the current iteration of operation 110 is added to the log. In this manner, the system log may be used to maintain a record of systems or applications that have been processed, which can be used to determine systems or applications that still need to be processed. Operations 108, 110, and 112 may iterate indefinitely or may function according to an operation schedule.

Figure 2:
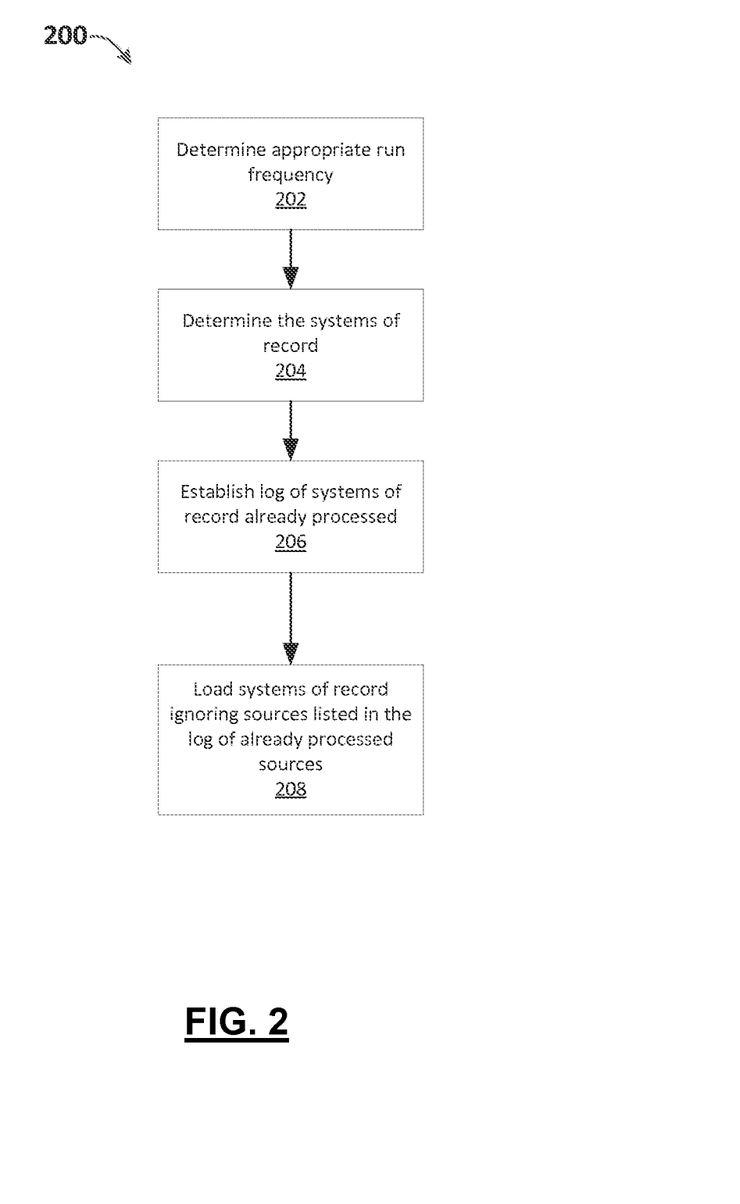
FIG. 2 is a flow diagram illustrating operations of a sub-process for loading resource requests in accordance with an illustrative embodiment.

FIG. 2 is a flow diagram illustrating operations of a sub-process 200 for loading resource requests in accordance with an illustrative embodiment. Sub-process 200 corresponds to the resource request loading operation 108 of process 100. In alternative embodiments, fewer, additional, and/or different operations may be performed. In an operation 202, the appropriate run frequency is determined. For example, resource requests can be loaded and processed for a period of X minutes, hours, or days, or according to any schedule. In an alternative embodiment, new resource requests may be loaded and processed every N minutes, hours, or days, etc. In an alternative embodiment, a resource request may be loaded for analysis as the resource request is received, in real-time or semi real-time. The resource request corresponds to resource requests received by systems of an organization that is implementing process 100. For example, with a financial institution, various systems of record are considered to be the authoritative data sources for a certain pieces of information (e.g., data provided to a web application hosted by the financial institution). Thus, it is useful to analyze resource requests that are received by these systems of record, as they are often most prone to attack by a malicious user or malware. Accordingly, in an operation 204, the systems of record are first determined. For example, a financial organization can have multiple systems of record as part of its infrastructure, each having system logs detailing resource requests received by the particular system of record. The logs maintain entries that correspond to HTTP requests received by the system. In an operation 206, a log of the system(s) of record already process is established. Initially, this log of already processed systems will be empty as no systems have yet been processed. However, this log will be updated as processing continues (e.g., via operation 112 of FIG. 1). In an operation 208, resource requests from the determined systems of record are loaded to be processed, ignoring the sources listed in the log of already processed systems.

FIG. 3 is a flow diagram illustrating operations of a sub-process 300 for analyzing a resource request in accordance with an exemplary embodiment. Sub-process 300 corresponds to the resource request analysis operation 110 of process 100. In alternative embodiments, fewer, additional, and/or different operations may be performed. In operation 302, the URI of the resource request is analyzed to determine the type of resource being requested. The type of the resource is compared to a list of targeted resource types, which can be used as an initial filter for a resource request. The list of targeted resource types generally corresponds to types of resources that are likely to be targeted by malware or a malicious individual. For example, the list of targeted types may include resource types such as: .jpg, .gif, .png, .js, .css, .config, .aspx, .html, .php, etc. The list of targeted types can be based on industry analysis or institutional knowledge, and can be updated and maintained in any suitable manner. If the type of resource being requested is not one of the targeted types, the resource request may be ignored, and sub-process 300 can terminate in operation 318. However, if the request is for a targeted type of resource, further analysis is performed.

In an operation 304, the requestor IP address is compared to the IP address whitelist. As discussed above, the IP address whitelist includes entries corresponding to trusted sources. If the requestor IP address is found on the IP address whitelist, then the resource request can be ignored, and sub-process 300 can terminate (operation 318). However, if the requestor IP address is not found on the IP address whitelist, the resource request can be analyzed further. In an operation 306, the requested resource is compared to the resource whitelist. If the resource is listed in the resource whitelist, then the resource request can be ignored and sub-process can terminate (operation 318). This is because based on the resource whitelist, the request is deemed to be an acceptable request. However, if the resource is not listed in the resource whitelist, then the resource request can be deemed to be in violation of the resource whitelist. In response, in an operation 308, a whitelist violation review process is initiated, which is detailed by sub-process 400 of FIG. 4. The whitelist violation review process may be initiated by sending an alert or other communication notifying a system or administrator of the whitelist violation. According to one embodiment, an administrator is automatically emailed details regarding the whitelist violation so that further review can be initiated. In another embodiment, the resource request is transmitted to an analysis system configured to further analyze the request. In another embodiment, the system executing sub-process 300 simulates executing the request to the requested server in order to analyze the response provided by the requested server. Operation 308 can be an asynchronous process, allowing for the whitelist violation review to be performed independently of performing analysis for additional resource requests. In this manner, additional resource requests can be analyzed while the whitelist violation review is performed concurrently or is performed at a later time. After initiating the whitelist violation review process for the request, in an operation 310, the whitelist violation and the request are added to a whitelist violation log.

In an operation 312, the requested resource is compared to the resource blacklist. If the resource being requested is not in the resource blacklist, then sub-process 300 may terminate (operation 318). However, if the resource is listed in the resource blacklist, then the resource request is deemed to be in violation of the resource blacklist. In response, in an operation 314, a blacklist violation review process is initiated, which is detailed further by sub-process 500 of FIG. 5. The blacklist violation review process can be initiated by sending an alert or other communication notifying a system or administrator of the blacklist violation. After initiating the blacklist violation review process for the request, in an operation 316, the blacklist violation and request are added to a blacklist violation log, and sub-process 300 may terminate (operation 318).

Figure 4:
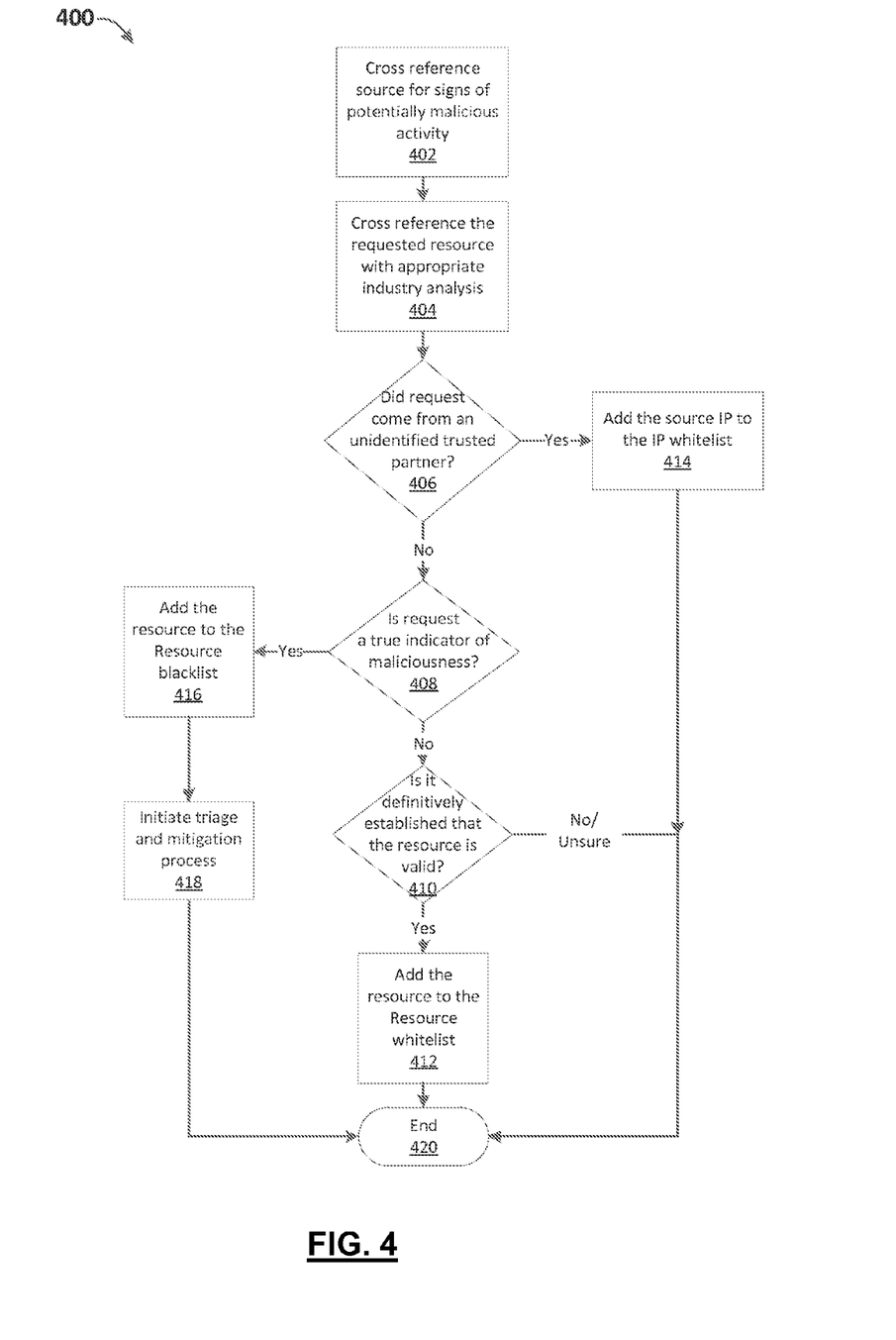
FIG. 4 is a flow diagram illustrating operations of a whitelist violation review sub-process in accordance with an exemplary embodiment.

FIG. 4 is a flow diagram illustrating operations of a whitelist violation review sub-process 400 in accordance with an exemplary embodiment. Sub-process 400 corresponds to operation 308 of sub-process 300, and provides a review process for a resource request that violated the resource whitelist as discussed above. In alternative embodiments, fewer, additional, and/or different operations may be performed. In an operation 402, using the whitelist violation log, a violation is selected, and the source of the resource request that caused the violation is cross-referenced for indications of malicious activity. For example historical activity related to the requestor IP address or a user account related to the request can be examined for signs of maliciousness. As another example, additional requests coming from the same source as the violating request can be analyzed for malicious activity. In an operation 404, the requested resource is further cross-referenced with appropriate industry analysis for indications of malicious activity. As an example, industry analysis dealing specifically with how certain attacks operate (e.g., which resources are requested or exploited by malware) can be analyzed. As another example, the requested resource can be cross-referenced against a variety of free and paid security tools/services to obtain additional information related to the request. As another example, the details related to the requested resource (e.g., the URI) may be cross-referenced with other security systems in place at an organization. In some scenarios it can be determined that the request came from a previously unidentified trusted partner (operation 406). For example, during the analysis performed during cross-referencing operation 402, it may be determined that a trusted source is using a new IP address that was not previously registered on the IP address whitelist. Accordingly, if the request did come from a trusted source, in operation 414, the new (or previously unidentified) IP address is added to the IP address whitelist. Operation 414 allows for tuning of the IP address whitelist as new trusted sources are detected or added. After adding the new IP address, sub-process 400 may terminate (operation 420).

Figure 6:
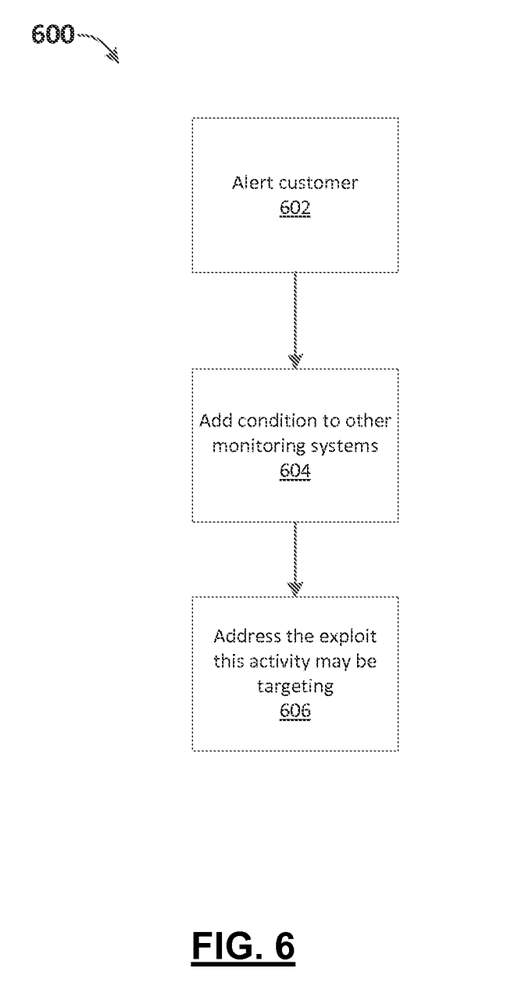
FIG. 6 is a flow diagram illustrating operations of a triage and mitigation sub-process in accordance with an exemplary embodiment.

However, if based on the previously discussed analysis the request did not come from an unidentified trusted partner, it is determined whether the request is a true indicator of maliciousness (operation 408). For example, if the requested resource is for a file named "error.js", and the cross-referenced industry analysis discloses that "error.js" is a resource that is associated with malware (e.g., a malware configuration file, a malware utility file, etc.), then it can be concluded that the resource request is truly of a malicious nature. As another example, the internal research of an organization can be used to confirm whether a resource request is of a malicious nature. In the scenario where resource request is deemed to be truly malicious, then resource is added to the resource blacklist (operation 416). After the resource is added to the blacklist, a triage and mitigation process may be initiated in operation 418. The triage and mitigation process is further described with reference to sub-process 600, as depicted in FIG. 6. However, If based on the above analysis the resource request cannot be asserted as a true indicator of maliciousness, then it is still possible that the resource request is actually a valid request. If it can be established that the request is definitely valid (operation 410), then the resource is added to the resource whitelist in operation 412. However, if the request cannot be definitely established as valid, then sub-process 400 may terminate (operation 420). In this manner, a future whitelist violation caused by a similar resource request will still be analyzed, and such analysis may continue to be initiated until it is determined whether the request is valid or malicious.

It should be noted that any of the information obtained during cross-referencing operations 402 and 404 may be used to further update a resource whitelist, an IP whitelist, and a resource blacklist. Additionally, such information may be particularly useful in determining potential system vulnerabilities and in adjusting other server or security settings to counteract future malicious activity.

Figure 5:
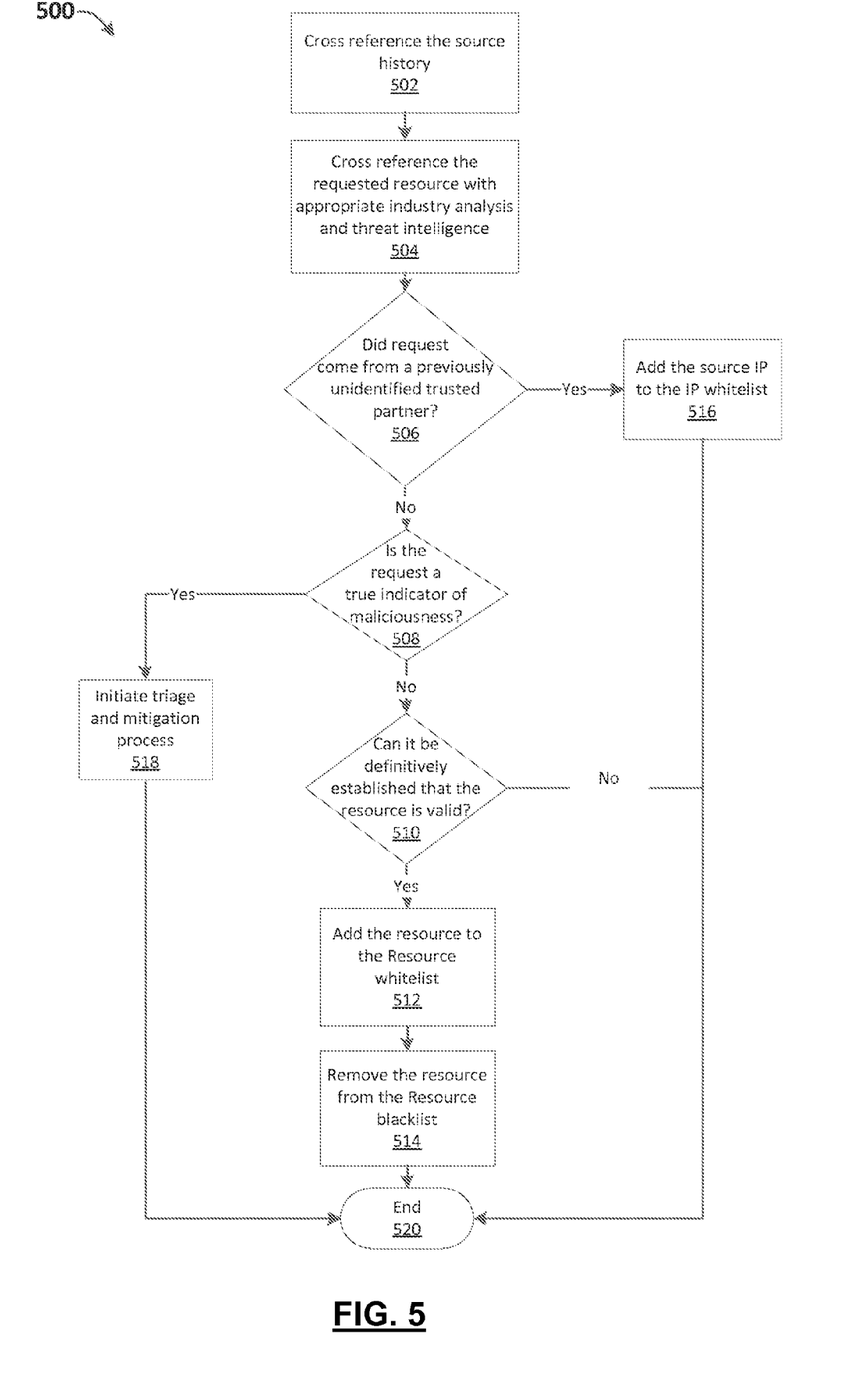
FIG. 5 is a flow diagram illustrating operations of a blacklist violation review sub-process in accordance with an exemplary embodiment.

FIG. 5 is a flow diagram illustrating operations of a blacklist violation review sub-process 500 in accordance with an exemplary embodiment. Sub-process 500 corresponds to operation 314 of sub-process 300, and provides a review process for a resource request that violated the resource blacklist as discussed above. In alternative embodiments, fewer, additional, and/or different operations may be performed. In an operation 502, using the blacklist violation log, a violation is selected, and the source of the request that caused the violation is cross-referenced for indications of malicious activity. In one embodiment, historical activity related to the requestor IP address or a user account related to the request is examined for signs of maliciousness. In another embodiment, additional requests coming from the source of the request are analyzed for malicious activity. In an operation 504, the requested resource is further cross-referenced with appropriate industry analysis for indications of malicious activity. Based on the analysis of operations 502 and 504, it can be determined that the request came from a previously unidentified trusted source (operation 506). If the request came from a trusted source, then, in operation 516 the new (or previously unidentified) IP address of the trusted source is added to the IP address whitelist. Operation 516 allows for tuning of the IP address whitelist as new trusted sources are detected or added.

After adding the IP address of the trusted source, sub-process 500 may terminate (operation 520). However, if the request did not come from a previously unidentified trusted partner, based on the analysis of operations 502 and 504, it is determined whether the request is a true indicator of maliciousness (operation 508). The request may be analyzed in a similar manner as discussed above with reference to operation 408. If the request is determined to be malicious, a triage and mitigation process may be initiated for the blacklist violation (operation 518). The triage and mitigation process is further described with reference to sub-process 600, as depicted in FIG. 6. However, if the resource request cannot be asserted as a true indicator of maliciousness, then it is possible that the resource request is a valid request. If it can be established that the request is definitely valid (operation 510), then the resource is added to the resource whitelist in operation 512. Additionally, since the resource was determined to be valid, its corresponding entry in the resource blacklist is removed from the blacklist (operation 514). However, if the request cannot be definitely established as valid, then sub-process 500 may terminate (operation 520). In this manner, a future blacklist violation caused by a similar resource request will still be analyzed, and such analysis may continue to be initiated until it is determined whether the request is valid or malicious.

It should be noted that any of the information obtained during cross-referencing operations 502 and 504 may be used to further update a resource whitelist, an IP whitelist, and a resource blacklist. Additionally, such information may be particularly useful in determining potential system vulnerabilities and in adjusting other server or security settings to counteract future malicious activity.

FIG. 6 is a flow diagram illustrating operations of a triage and mitigation sub-process 600 in accordance with an exemplary embodiment. Sub-process 600 corresponds to both operation 418 of sub-process 400 and operation 518 of sub-process 500. Sub-process 600 provides a triage and mitigation process in the case that a malicious resource request is detected as described above. In alternative embodiments, fewer, additional, and/or different operations may be performed. In operation 602, a customer related to the resource request can be alerted, if applicable. For example, the resource request may have come from an IP address determined or known to be associated with the customer. As another example, the resource request may include a field related to an account (e.g., an account ID, login information, etc.) from which the customer may be determined. If the customer can be determined, then the customer can be notified of the malicious activity coming from the customer's system. In an operation 604, other monitoring systems of the organization implementing process 100 are informed of the malicious request. This can include adding conditions to the other monitoring systems to check for or safeguard against the malicious request. In an operation 606, an exploit that the malicious request is targeting is further addressed. In one embodiment, a user who is associated with request may have his account locked until they confirm that that he has cleaned his system of malware. The locking and reactivation of an account can be manual or automated by the account management systems of the organization. In another embodiment, traffic coming from the requestor IP address is blocked (e.g., by a firewall of the organization). In another embodiment, traffic coming from the requestor IP address is allowed but is monitored for further observation. In another embodiment, systems of the organization are configured automatically analyze the source system of the malicious traffic. In another embodiment, a patch or hotfix is applied to the server or application that received the request. In another embodiment, a configuration setting of a server or application is adjusted to protect against future exploits of the same nature. Other mitigation steps may also be implemented as deemed appropriate by an organization.

Figure 7:
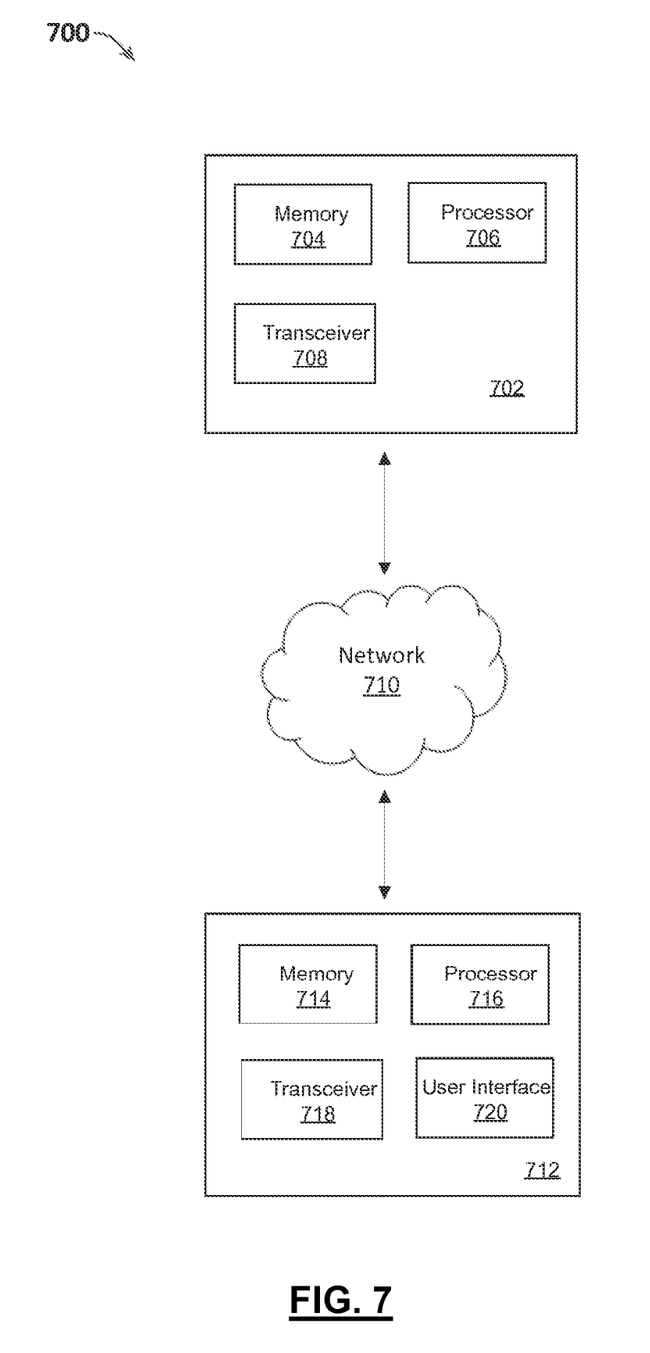
FIG. 7 is a block diagram illustrating a system for implementing resource request monitoring in accordance with an illustrative embodiment.

FIG. 7 is a block diagram illustrating a system 700 for implementing resource request monitoring in accordance with an illustrative embodiment. System 700 includes a financial institution computing device 702 and a user computing device 712. For example, computing device 702 may be one or more servers hosting a financial web application, and computing device 712 may be a home computer of a customer. In an illustrative embodiment, financial institution computing device 702 is used by a financial institution to monitor HTTP resource request received from user computing device 712. For example, user computer device 712 may contain malware or may be controlled by a malicious user, and resource requests may be transmitted to computing device 702 for a malicious purpose. Computing device 702 can monitor these resource requests and take action as described herein. User computing device 712 can be utilized by a customer to access the financial web application hosted by computing device 702. For example, the customer may use his home computer to log on to his account provided by the financial institution. Financial institution computing device 702 and user computing device 712 can exchange information over a network 710. Network 710 can be a wide area network such as the Internet, a cellular network, a local area network, a wired or wireless telecommunications network, and/or any other data communication network known to those of skill in the art.

Financial institution computing device 702, which can be any type of computer, can be implemented as a server that provides customers with a website accessing various applications provided by the financial institution. Financial institution computing device 702 includes a memory 704, a processor 706, and a transceiver 708. In alternative embodiments, financial institution computing device 702 may include additional components such as a user interface (i.e., a display, a keyboard, a touch screen, a touch pad, etc.). Each of the components of financial institution computing device 702 can be operatively coupled to one another according to any methods known to those of skill in the art.

Memory 704 can be used to store or access customer information, receive customer requests, receive HTTP requests, store or transmit financial account information, and store and/or transmit any other data pertaining applications or services provided by the financial institution. Memory 704, which is a computer-readable medium and can include one or more memory devices (e.g., RAM, ROM, Flash Memory, hard disk storage, etc.), can also be used to store computer-readable instructions that, when executed, cause financial institution computing device 702 to perform and/or facilitate any of the operations described herein for monitoring resource requests. Processor 706 can be configured to execute the computer-readable instructions. Processor 706 can also be configured to communicate with and/or control transceiver 708. Processor 706 may be implemented as a general-purpose processor, an application specific integrated circuit (ASIC), one or more field programmable gate arrays (FPGAs), a digital-signal-processor (DSP), a group of processing components, or other suitable electronic processing components.

Transceiver 708 can be used to receive and/or transmit information through network 710. In an illustrative embodiment, transceiver 708 can communicate with a transceiver 718 of user computing device 712. As an example, transceiver 708 can receive an HTTP resource request from transceiver 718. Transceiver 708 can also transmit data to transceiver 718. In an illustrative embodiment, transceiver 708 can be an internal or external network card. Transceiver 708 may also be any other receiving component and/or transmitting component known to those of skill in the art.

User computing device 712 can be a laptop computer, a desktop computer, a personal digital assistant, a cellular telephone, and/or any other type of computing device known to those of skill in the art. User computing device 712 includes a memory 714, a processor 716, transceiver 718, and a user interface 720. In alternative embodiments, user computing device 712 can include fewer, additional, and/or different components. For example, user computing device 712 may also include a battery, a printer, etc. In an illustrative embodiment, memory 714 (e.g., RAM, ROM, Flash Memory, hard disk storage, etc.) can be configured to store a network browser capable of accessing a web application or website provided by the financial institution. Processor 716 can be configured to execute any computer-readable instructions stored in memory 714. Processor 716 can also be configured to communicate with and/or control user interface 720, transceiver 718, and any other components of user computing device 712. Processor 716 may be implemented as a general-purpose processor, an application specific integrated circuit (ASIC), one or more field programmable gate arrays (FPGAs), a digital-signal-processor (DSP), a group of processing components, or other suitable electronic processing components.

Transceiver 718 can be used to receive and/or transmit information through network 710. In an illustrative embodiment, transceiver 718 can communicate with transceiver 708 of financial institution computing device 702. As an example, transceiver 718 can receive data sent from transceiver 708 in response to a request transmitted by transceiver 718. In an illustrative embodiment, transceiver 718 can be an internal modem or networking card. Transceiver 718 may also be any other receiving component and/or transmitting component known to those of skill in the art. User interface 720 can include a computer mouse, a keyboard, a display, a touch screen, a touch pad, and/or any other component that allows the customer to interact with user computing device 712.

Any of the operations described herein can be performed by computer-readable (or computer-executable) instructions that are stored on a computer-readable medium such as memory 704. The computer-readable medium can be a computer memory, database, or other storage medium that is capable of storing such instructions. Upon execution of the computer-readable instructions by a computing device such as computing device 702, the instructions can cause the computing device to perform the operations described herein.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method comprising:
   establishing an IP address whitelist comprising an acceptable IP address;
   establishing a resource whitelist comprising an acceptable resource request;
   establishing a resource blacklist comprising an indicator of a malicious resource request;
   establishing a log of systems of record already processed;
   analyzing, by a computing device, a resource request from a system not listed in the log of systems of record already processed, wherein resource requests from systems listed in the log of already processed sources are not analyzed, wherein analyzing the resource request comprises:
   determining if a requester IP address of the resource request is in the IP address whitelist;
   determining if the requested resource is in the resource whitelist; and
   determining if the requested resource is in the resource blacklist;
   initiating a whitelist violation review, responsive to determining that the requester IP address is not in the IP address whitelist and the requested resource is not in the resource whitelist, and
   initiating a blacklist violation review, responsive to determining that the requested resource is in the resource blacklist and the requester IP address is not in the IP address whitelist and the requested resource is not in the resource whitelist.

2. The method of claim 1, further comprising:
   determining if a type of the requested resource is a targeted type, and wherein analyzing the resource request is responsive to determining that the type of the requested resource is targeted.

3. The method of claim 1, further comprising:
   logging details related to resource request on a whitelist violation log, responsive to the whitelist violation review.

4. The method of claim 3, wherein the whitelist violation review comprises:
   analyzing a history corresponding to the requestor IP address; and
   cross-referencing the requested resource with additional security.

5. The method of claim 4, wherein the whitelist violation review further comprises:
   determining if the requester IP address is from a previously unidentified trusted partner; and
   responsive to determining that the requester IP address is from a previously unidentified trusted partner, adding the requester IP address to the IP address whitelist.

6. The method of claim 5, wherein the whitelist violation review further comprises:
   responsive to determining that the requester IP is not from a previously unidentified trusted partner, determining if the resource request is a true indicator of maliciousness;
   responsive to determining that the resource request is a true indicator of maliciousness, adding the requested resource to the resource blacklist; and
   responsive to determining that the resource request is not a true indicator of maliciousness, adding the requested resource to the resource whitelist.

7. The method of claim 6, wherein the whitelist violation review further comprises:
   responsive to determining that the resource request is a true indicator of maliciousness, initiating a mitigation process for the resource request.

8. The method of claim 7, wherein the mitigation process includes at least one of alerting a customer, informing an additional security system of the resource request, and addressing an exploit that the resource request is targeting.

9. The method of claim 1, further comprising logging the resource request on a blacklist violation log, responsive to the blacklist violation review.

10. The method of claim 9, wherein the blacklist violation review comprises:
  analyzing a history corresponding to the requester IP address; and cross-referencing the requested resource with additional security.

11. The method of claim 10, wherein the blacklist violation review further comprises:
  determining if the requester IP address is from a previously unidentified trusted partner; and
  responsive to determining that the requester IP address is from a previously unidentified trusted partner, adding the requester IP address to the IP address whitelist.

12. The method of claim 11, wherein the blacklist violation review further comprises:
  responsive to determining that the requester IP is not from a previously unidentified trusted partner, determining if the resource request is a true indicator of maliciousness;
  responsive to determining that the resource request is a true indicator of maliciousness, initiating a mitigation process for the resource request; and
  responsive to determining that the resource request is not a true indicator of maliciousness:
  adding the requested resource to the resource whitelist; and
  removing the requested resource from the resource blacklist.

13. A system comprising:
  a computing device configured to:
    establish an IP address whitelist comprising acceptable IP addresses;
    establish a resource whitelist comprising acceptable resource requests;
    establish a resource blacklist comprising indicators of malicious resource requests;
    establish a log of systems of record already processed;
    analyze a resource request from a system not listed in the log of systems of record already processed, wherein resource requests from systems listed in the log of already processed sources are not analyzed, wherein to analyze the resource request, the computing device is configured to:
      determine if a requester IP address of the resource request is in the IP address whitelist;
      determine if the requested resource is in the resource whitelist;
      and determine if the requested resource is in the resource blacklist;
      initiate a whitelist violation review, responsive to determining that the requester IP address is not in the IP address whitelist and the requested resource is not in the resource whitelist; and
      initiate a blacklist violation review, responsive to determining that the requested resource is in the resource blacklist and the requester IP address is not in the IP address whitelist and the requested resource is not in the resource whitelist.

14. The system of claim 13, wherein the computing device is further configured to:
  determine if a type of the requested resource is a targeted type, and wherein analyzing the resource request is responsive to determining that the type of the requested resource is targeted.

15. The system of claim 13, wherein the computing device is further configured to log details related to the resource request on a whitelist violation log, responsive to the whitelist violation review.

16. The system of claim 13, the computing device is further configured to log the resource request on a blacklist violation log, responsive to the blacklist violation review.

17. A non-transitory computer-readable medium having instructions stored thereon, the instructions comprising:
  instructions to establish an IP address whitelist comprising acceptable IP addresses;
  instructions to establish a resource whitelist comprising acceptable resource requests;
  instructions to establish a resource blacklist comprising indicators of malicious resource requests;
  instructions to establish a log of systems of record already processed;
  instructions to analyze a resource request from a system not listed in the log of systems of record already processed, wherein resource requests from systems listed in the log of already processed sources are not analyzed, wherein the instructions to analyze the resource request comprise:
    instructions to determine if a requester IP address of the resource request is in the IP address whitelist;
    instructions to determine if the requested resource is in the resource whitelist; and
    instructions to determine if the requested resource is in the resource blacklist;
  instructions to initiate a whitelist violation review, responsive to determining that the requester IP address is not in the IP address whitelist and the requested resource is not in the resource whitelist; and
  instructions to initiate a blacklist violation review, responsive to determining that the requested resource is in the resource blacklist and the requester IP address is not in the IP address whitelist and the requested resource is not in the resource whitelist.

18. The non-transitory computer-readable medium of claim 17, wherein the instructions further instructions to log details related to the resource request on a whitelist violation log, responsive to the whitelist violation review.

19. The non-transitory computer-readable medium of claim 17, wherein the instructions further comprise instructions to log the resource request on a blacklist violation log, responsive to the blacklist violation review.

* * * * *